Sept. 18, 1962 A. BECHLER 3,054,161
AUTOMATIC-LATHE ATTACHMENT
Filed Aug. 22, 1960 2 Sheets-Sheet 1

Inventor
André Bechler
By Stevens Davis Miller & Mosher
Attorneys

United States Patent Office 3,054,161
Patented Sept. 18, 1962

3,054,161
AUTOMATIC-LATHE ATTACHMENT
André Bechler, Rue Centrale 4, Moutier, Bern,
Switzerland
Filed Aug. 22, 1960, Ser. No. 50,996
Claims priority, application Switzerland Sept. 10, 1959
1 Claim. (Cl. 29—56)

My present invention relates generally to improvements in automatic lathes and, more particularly, to an improved attachment on such lathes for locking and unlocking the tool-spindle carrier.

Automatic-lathe attachments for the purpose indicated are known, in which a carrier of tool spindles, which are parallel to the principal lathe axis and movable in the direction thereof, is pivotable about an axis parallel to said principal axis. Pivotal movement of the carrier, for the purpose of aligning one of the tool spindles with the principal axis, is controlled by a first cam which is spring-loaded and mounted on a control shaft of the lathe. The axial movement of a tool spindle, which is in the operative position, is controlled by a second cam mounted on said control shaft.

While accelerating the speed of machining operations, continuously increasing accelerations and mass forces of the carrier and of the linkage serving to pivotally move the same have to be taken into account. For this reason, and also for the purpose of increasing the precision with which the tool spindle that is in operative position is aligned with the principal axis, the necessity arises for a suitable engageable and disengageable carrier-locking mechanism. The present invention aims to solve this problem in an especially simple and excellent manner.

Such solution is attained by movably mounting a carrier locking member in a direction parallel to the principal axis and on a stationary bearing and by providing the second cam with a supporting disc and with the same number of cam elements detachably and circumferentially secured thereto as there are tool spindles, each cam element being associated with one of the tool spindles and comprising a cam surface suited not only for axially moving the associated tool spindle but also for actuating the locking member.

One form of the invention is shown by way of example in the accompanying drawings, in which—

Figure 1:
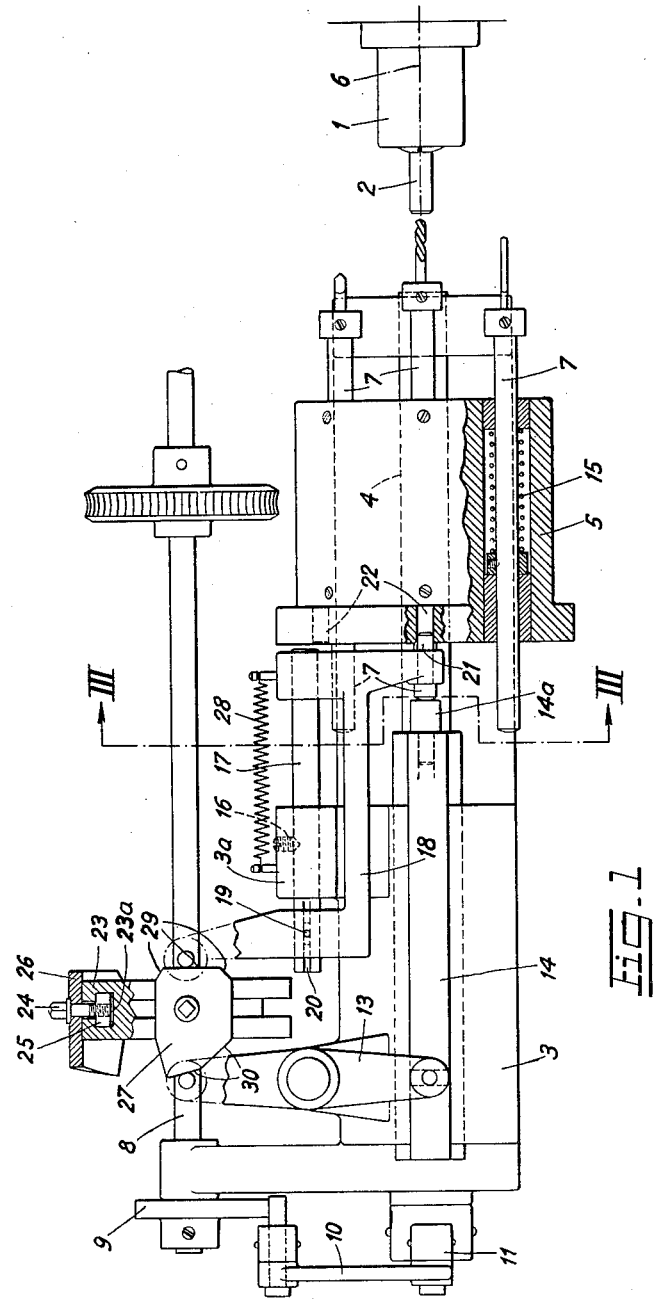
Figure 2:
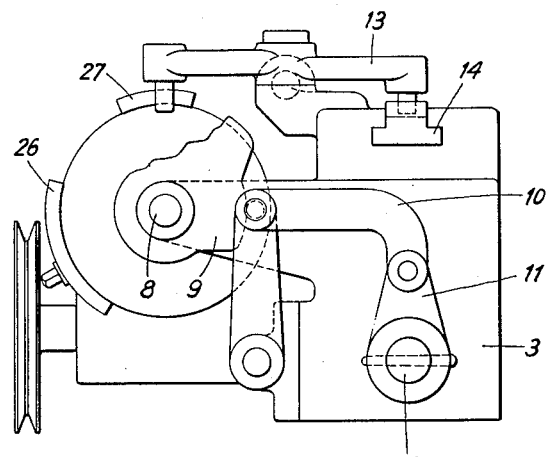
Figure 3:
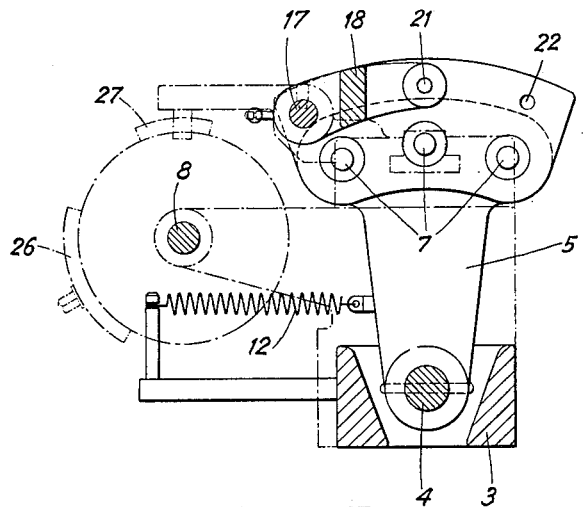

FIG. 1 shows a top plan view;
FIG. 2 is a side view as seen from the left in FIG. 1; and
FIG. 3 is a section on the lines III—III of FIG. 1.

Numeral 1 denotes the forward end of the work-carrying spindle, and numeral 2 is the workpiece or stock bar. The housing 3 of the attachment disclosed by my present invention is secured to the bed (not shown) of the automatic lathe. A tool spindle carrier 5 is pivoted to said housing on the axle pin 4 for pivotal movement about an axis parallel to the principal axis 6. In carrier 5 are movable, in a direction parallel to the principal axis 6 and possibly also rotatably, tool spindles 7 which are equipped with tools such as drills, taps and so on. At any one time, a tool spindle 7 may be aligned to the principal axis 6 by pivotally moving, against the action of spring 12, the carrier 5 by means of the cam disc 9 rigidly mounted on the lathe control shaft 8, and via the link 10 and the arm 11 fixed to carrier 5.

A selected tool spindle 7, which is in the operative position, is axially moved, against the action of the spindle-restoring spring 15, by means of a cam yet to be described which is secured to control shaft 8, and also by means of the lever 13 fulcrumed on housing 3 and the rocker arm 14 which is mounted in said housing and is provided in front with a pin 14a. So far, the construction is well known and is disclosed in British Patent No. 741,919 or the corresponding United States Patent No. 2,870,656.

Added is a means for locking the carrier, which is constructed and operates as follows:

In a lateral bearing eye 3a of housing 3 is secured by means of a grub screw 16 a guide pin 17 on which is guided, forwardly and rearwardly of eye 3a, a locking member 18 movable in a direction parallel to the principal axis 6. Locking member 18 is secured against rotation by a pin 19 which is secured therein and which is engaged in a keyway 20 of guide pin 17. Member 18 in front is provided with a locking pin 21 which accurately fits into bores 22 which are so disposed on carrier 5 that when pin 21 is engaged in one of the bores 22, the appurtenant tool spindle is accurately alined on to the principal axis 6. The pins 21 and the bores 22 may advantageously be slightly conical.

On control shaft 8 is rigidly mounted a supporting disc 23 which has a circumferential groove 23a of T-shaped cross-section. Cam means 26, 27 are mounted on disc 23 by means of screws 24 which co-act with square nuts 25 that are movably disposed in groove 23a. Said cam means are detachably mounted on disc 23 and are circumferentially adjustable after the screws have been loosened. Each of said cam means has, on its front side, a cam face 29 for controlling the movement of locking member 18, 21 against the action of a restoring spring 28. Each cam means, on its rear side, has a cam face 30 for controlling the longitudinal movement of the appurtenant tool spindle 7. The movement of locking member 18, 21, originated by cam face 29, may be readily tuned to the forward movement of the tool spindle produced by cam face 30, whereby a maximum acceleration of the operating cycle of the attachment and the automatic lathe, respectively, is made possible. When interchanging the tools, appurtenant and correspondingly formed cam means may be readily mounted on to disc 23.

What I claim as new and desire to secure by Letters Patent is:

In an automatic-lathe attachment comprising a plurality of tool spindles disposed parallel to the principal lathe axis, a spindle carrier pivotable about an axis parallel to said principal axis, said spindles being movable in said carrier in direction of said principal axis, a first cam means for pivotally moving said carrier to aline at any one time one of said spindles on to said principal axis, said first cam means being spring-loaded and mounted on a control shaft of the lathe, and a second cam means mounted on said control shaft for axially moving said one spindle into its operative position, the improvement comprising a member for locking said carrier, said member being mounted movable in a stationary bearing in a direction parallel to said principal axis, and said second cam means comprises a disc and a plurality of cam elements detachably secured to the circumference thereof, the number of said elements being equal to that of said spindles and each having a cam face for axially moving its associated tool spindle and a cam face for actuating said locking member.

References Cited in the file of this patent
FOREIGN PATENTS
741,919    Great Britain _____ Dec. 14, 1955